J. H. HAMLIN & J. C. BURFORD.
TIRE.
APPLICATION FILED JAN. 5, 1916.

1,186,311. Patented June 6, 1916.

WITNESSES
J. V. Phillips
A. E. Trainor

INVENTORS
JOSEPH H. HAMLIN,
JAMES C. BURFORD.
BY Munn & Co.
ATTORNEYS

UNITED STATES PATENT OFFICE.

JOSEPH HOUCK HAMLIN AND JAMES C. BURFORD, OF WINSTON-SALEM, NORTH CAROLINA.

TIRE.

1,186,311.   Specification of Letters Patent.   Patented June 6, 1916.

Application filed January 5, 1916. Serial No. 70,425.

*To all whom it may concern:*

Be it known that we, JOSEPH H. HAMLIN and JAMES C. BURFORD, citizens of the United States, and residents of Winston-Salem, in the county of Forsyth and State of North Carolina, have invented a new and useful Improvement in Tires, of which the following is a specification.

Our invention is an improvement in tires, for use with motor vehicles, and the invention has for its object to provide a tire of the character specified, capable of attachment to the ordinary forms of wheel rim, and of metal properly shaped to resist crushing stress while at the same time the tire is sufficiently resilient to counteract shock and jar imparted thereto and to prevent the transmission of such shock and jar to the wheel.

Figure 1:
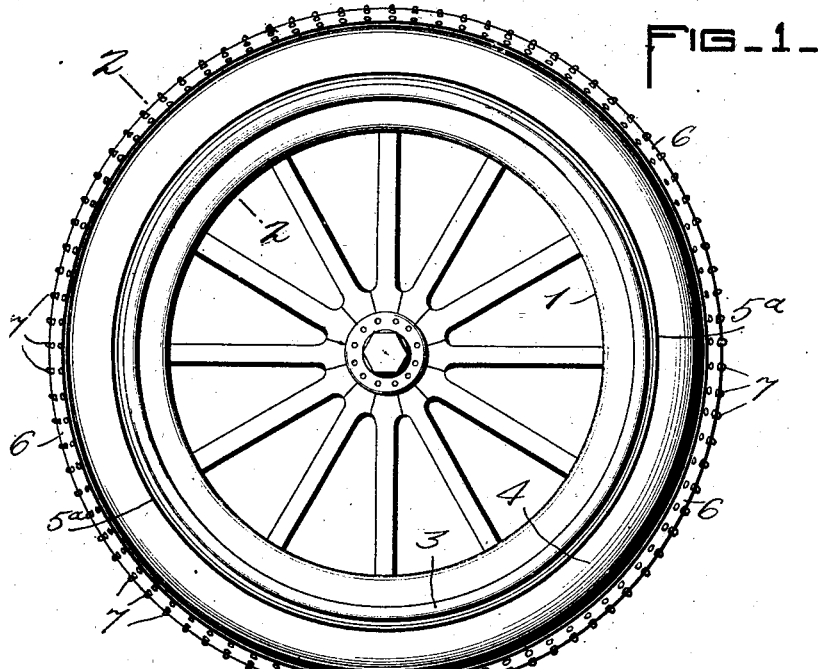
Figure 2:
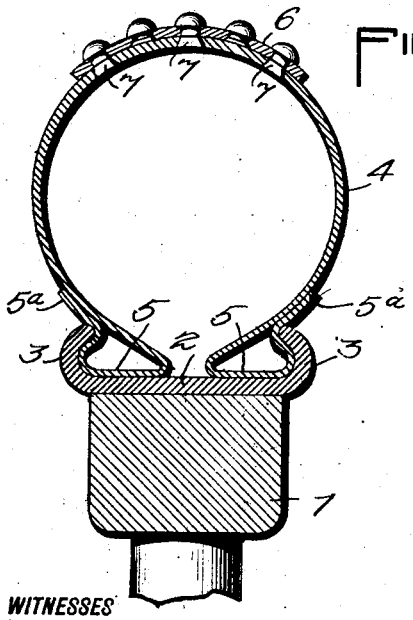
Figure 3:
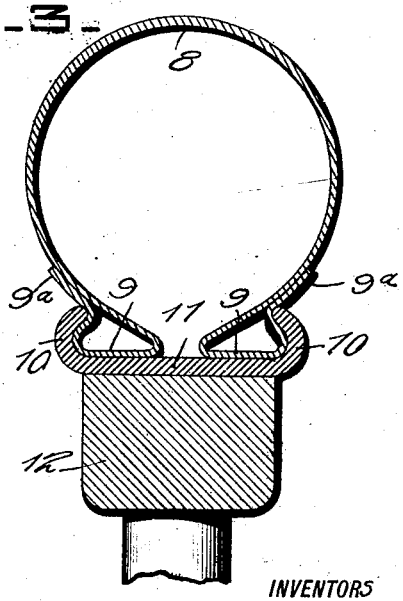

In the drawings:—Figure 1 is a side view of a wheel provided with the improved tire, Fig. 2 is an enlarged section on the line 2—2 of Fig. 1, and Fig. 3 is a sectional view similar to Fig. 2, showing a modified construction.

The present embodiment of the invention is shown in connection with a wheel 1, having a metal rim 2, seated on the periphery of the wheel and having flanges 3 at its opposite side edges for a purpose to be presently described. These flanges are formed by bending the material of the rim at each side thereof over upon the outer face of the rim, and each of the said flanges 3 is arc-shaped or curved, and arranged with its concave face inward.

The tire is of sheet metal bent into approximately cylindrical form but having a split on the inner side thereof. As shown, the tire 4 is provided at each side of the split with a rib 5, and each of the ribs is formed in the present instance, by bending the edges of the tire at each side of the split outwardly and then backwardly and inwardly toward the outer face of the tire, and it is then bent again outwardly as indicated at 5$^a$ parallel with the outer face of the tire. The ribs are roughly triangular in cross section, being of the same cross sectional shape as the holding ribs in the ordinary clencher tire.

In use, the tire is arranged as shown in Figs. 1 and 2, the ribs 5 fitting on the inner sides of the flanges 3, and it will be noticed that that angle of each rib which is outermost is rounded to fit the inner surface of the adjacent flange.

If desired the tread of the tire may be reinforced by a strip or band 6 of leather or the like, arranged at the tread. The strip in the present instance is held in close contact with the tread of the tire, by means of rivets 7. These rivets as shown in Fig. 2 are passed from within outwardly and each of the openings in the tire for receiving a rivet is tapering or frusto-conical in form. The heads of the rivets are shaped to fit the tapering openings and the outer end of each rivet is upset, as shown in Fig. 2 to prevent disengagement of the tread 6 and to afford a firmer grip for the tire. The upset outer ends of the rivets form rounded beads which extend beyond the outer surface of the tread 6, and constitute a series of knobs or spurs extending entirely around the tread of the wheel.

In the embodiment of the invention shown in Fig. 3 the tire 8 is of the same shape and construction as the tire 4, having the ribs 9 at opposite sides of the split and corresponding to the ribs 5 of Figs. 1 and 2, and these ribs are engaged on the inner side of the flanges 10 of the rim 11, the said rim being supported on the wheel 12.

The tire 8 shown in Fig. 3 is not provided with the strip or band of leather, and the metal in this case comes in direct contact with the ground. It will be obvious that if desired the ribs 9 might be of solid construction or they might be formed in any other convenient manner.

With the present form of tire there is no possibility of puncture and a puncture would in no manner affect the proper function of the tire, since an air cushion is not used. The resiliency of the metal is utilized to provide the cushioning action.

It will be noticed from an inspection of Fig. 3 that the rib 9 of the said construction has a portion 9$^a$ corresponding to the portion 5$^a$ of Fig. 2. The arrangement of these portions 5$^a$ and 9$^a$ provides a cushion, and as well permits adjustment of the rib to the rim. It also protects the side wall of the tire, strengthening and reinforcing the same at a point where strength and reinforcement is needed. It is at this point where the tire is subjected to the heaviest stress, and by so arranging the rib the rib is adjustable to slight variations in the size of the rims.

We claim:—

1. A tire for motor vehicles, comprising a tubular body of annular form and having a continuous split at its inner surface between its inner edges and having its said inner edges bent outwardly to form an integral holding rib at each side of the split terminating in a reinforcement for the respective body side.

2. A tire for motor vehicles, comprising a tubular body of annular form and having a continuous split at its inner surface and having integral holding ribs at the sides of the split, said ribs being formed by bending the edges of the tubular body outwardly into the rib formation, the said edges being extended and superposed on the outer surface of the tire for a distance beyond the rib.

3. A tire for motor vehicles, comprising a tubular body of annular form having its inner edges bent to form hollow rim engaging ribs, said ribs being spaced from one another and provided with extensions projecting along the outer surfaces of the inner portions of the body sides and engaging the same for the purpose described.

JOSEPH HOUCK HAMLIN.
JAMES C. BURFORD.

Witnesses:
Thos. E. Kapp,
J. C. Nicholson.

Copies of this patent may be obtained for five cents each, by addressing the "Commissioner of Patents, Washington, D. C."